United States Patent [19]

Murata et al.

[11] Patent Number: 4,486,559

[45] Date of Patent: Dec. 4, 1984

[54] TONER COMPOSITION FOR THE DEVELOPMENT OF ELECTROSTATIC LATENT IMAGES AND A METHOD OF PREPARING THE SAME

[75] Inventors: Hideki Murata; Sadatugu Terada; Kiyoshi Tamaki; Tsuneo Wada, all of Hino; Akitoshi Matsubara; Hiroyuki Takagiwa, both of Hachioji, all of Japan

[73] Assignee: Konishiroku Photo Industry Co., Ltd., Tokyo, Japan

[21] Appl. No.: 276,207

[22] Filed: Jun. 23, 1981

[30] Foreign Application Priority Data

Jul. 1, 1980 [JP] Japan .................................... 55-90317

[51] Int. Cl.³ ...................... C08K 3/04; C08F 255/02
[52] U.S. Cl. .................................... 523/468; 524/509; 524/513; 524/514; 524/515; 524/522; 524/529; 525/120; 525/128; 525/145; 525/177; 525/184; 525/214; 525/322; 525/324
[58] Field of Search ............................... 525/322, 324

[56] References Cited

U.S. PATENT DOCUMENTS

| | | | |
|---|---|---|---|
| 3,143,521 | 8/1964 | Thompson et al. | 525/324 |
| 3,496,251 | 2/1970 | Takahashi et al. | 525/324 |
| 3,565,974 | 2/1971 | Ohnuma et al. | 525/322 |

FOREIGN PATENT DOCUMENTS

| | | | |
|---|---|---|---|
| 137312 | 8/1979 | Fed. Rep. of Germany | 525/324 |
| 145172 | 11/1980 | Fed. Rep. of Germany | 525/324 |
| 1345371 | 1/1974 | United Kingdom | 525/324 |

*Primary Examiner*—Paul Lieberman
*Assistant Examiner*—Robert E. L. Sellers
*Attorney, Agent, or Firm*—Frishauf, Holtz, Goodman & Woodward

[57] ABSTRACT

Herein disclosed are a toner composition for the development of electrostatic latent images which comprises a polymer obtained by polymerizing a polymerizable monomer or monomers in the presence of a chlorinated polyolefin, and a method for preparing the same.

28 Claims, No Drawings

TONER COMPOSITION FOR THE DEVELOPMENT OF ELECTROSTATIC LATENT IMAGES AND A METHOD OF PREPARING THE SAME

The present invention relates to a toner composition for the development of electrostatic latent images in electrophotography, electrostatic recording, electrostatic printing, etc. and a method of preparing such a toner composition.

Methods for developing electrostatic latent images are roughly classified into the following: (1) so-called "wet development method" in which use is made of a developer containing various pigments and dyes finely dispersed in an insulating solvent, and (2) so-called "dry development method" wherein use is made of a finely powdered developer called "toner" which contains a coloring agent such as carbon black dispersed in natural or synthetic resins. The dry development method includes the cascade, fur brush, magnetic brush, impression and powder cloud methods. The present invention is concerned with a toner for use in the dry development method.

According to a conventional method of producing toners for use in dry development, a coloring agent is mixed with a natural or synthetic resin, and the mixture is molten and kneaded at a high temperature. The obtained mixture is then allowed to cool to room temperature and pulverized to grains of a size required for use as toners. However, the fine powder obtained according to such a conventional method has a very wide distribution of grain sizes. Thus, this conventional method is disadvantageous in that, in order to obtain a toner suitable for practical use, the fine powder obtained must further be subjected to a classification step, which makes the production process complicated and increases the cost.

On the other hand, as a method that does not involve any pulverizing step but directly prepares fine colored polymer particles, a technique based on polymerization has been proposed. Such a technique is described, for example, in Japanese patent publication Nos. 10231/1961, 51830/1972 and 14895/1976, and Japanese patent provisional publication Nos. 17735/1978, 17736/1978 and 17737/1978.

Such a conventional method is based on so-called "suspension polymerization" and directly produces toners by suspending a polymerization composition, which contains a polymerizable monomer, a polymerization initiator and a coloring agent, in an aqueous dispersing medium, and polymerizing the suspension.

This conventional method has the advantage that the formed toner particles are spherically shaped and show excellent fluidity, that the production process is simple and that the cost is low.

However, this polymerization method is disadvantageous in that charge controlling agents which affect the polymerization reaction cannot be used or, even when possible, they can only be used in a limited quantity. As a result, this method cannot give toners having a satisfactory charge controlling property. In addition, when charge control is effected through treatment with a surface-active agent as described in Japanese patent publication No. 10231/1961, dependence of the surface-active agent on humidity directly affects the charge characteristics of toners, greatly destabilizing the friction charge characteristics thereof. When charge control is carried out by using a monomer for a toner binder resin which has been substituted by a polar group as disclosed in Japanese patent publication No. 14895/1976, there is a limitation concerning the control of the softening point and the glass transition point, which can affect the fixing property and blocking, because the toner binder resin is in a special form.

An object of the present invention is to provide a novel toner composition for the development of electrostatic latent images, which eliminates the disadvantages of the conventional toners.

Another object of the present invention is to provide a toner composition for the development of electrostatic latent images, which has an excellent charge characteristic.

Further object of the present invention is to provide a method of preparing a toner composition for the development of electrostatic latent images, which can achieve the object described above.

Still further objects of the present invention is to provide a method of preparing a toner composition for the development of electrostatic latent images with a low production cost.

These objects of the present invention can be achieved by a toner composition for the development of electrostatic latent images which comprises a polymer obtained by polymerizing a polymerizable monomer or monomers in the presence of a chlorinated polyolefin (hereinafter called the toner composition according to the present invention).

The toner composition according to the present invention is prepared by a method which comprises a process for polymerizing a polymerizable monomer or monomers in the presence of a chlorinated polyolefin.

Chlorinated polyolefins used according to the present invention have an excellent solubility in polymerizable monomers and, therefore, can give toners which show smaller fluctuation in charge amount and more stable negative charge characteristics compared with toners prepared by so-called "kneading pulverization method".

Chlorinated polyolefins may be used in any amount according to the present invention. Normally, they are used in a proportion of 1 to 30% by weight based on the toner composition according to the present invention.

Chlorinated polyolefins used according to the present invention may be any of those which are normally used, may be resinous, oily, rubber-like or waxy. According to the present invention, the polyolefins having a degree of chlorination of 0.7 to 0.85 per carbon atom are preferably used. If the degree of chlorination is too low, it is sometimes impossible to obtain toners with good negative charge characteristics. If it is too high, the solubility of the chlorinated polyolefins in the polymerizable monomers becomes poor, causing the charge amount of toners to fluctuate, and the softening point of the obtained toners becomes liable to increase.

Of the chlorinated polyolefins used according to the present invention, as the chlorinated polypropylenes, compounds having the following general formula (I) can be mentioned as preferable ones.

General formula (I):

$$(C_3H_{6-x}Cl_x)_l \qquad (I)$$

wherein x is an integer of 1 to 4 and l is an integer of 5 or more.

In general formula (I), it is preferable that l is an integer of 50 or more.

As the chlorinated polyethylenes, compounds having the following general formula (II) may be mentioned as preferable ones.

General formula (II):

$(C_2H_{4-y}Cl_y)_m$ (II)

wherein y is 1, 2 or 3, and m is an integer of 5 or more.

In general formula (II), m is preferably an integer of 50 or more.

As the chlorinated rubbers, compounds having the following general formula (III) may be mentioned as preferable ones.

General formula (III):

$(C_{10}H_{18-z}Cl_z)_n$ (III)

wherein z is an integer of 3 to 15, and n is an integer of 3 or more.

In general formula (III), n is preferably an integer of 25 or more.

Measurements of viscosity and a study on the characteristics of the prepared toners revealed that the chlorinated polyolefins having a relatively high density, i.e. a relatively high molecular weight are preferable according to the present invention.

The chlorinated polyolefins to be used according to the present invention are commercially available, for example, under the name "Superchlon" (Supplier: Sanyo-Kokusaku Pulp Co., Ltd.).

Chlorinated polypropylenes: Superchlon 406 (50), 306 (100), 106L (200), 106H (300), chlorinated polyethylenes: Superchlon LT (90), 907LTA (90), 907LL (250), 907MA (700), 907HA (800), 507 (50), 510 (150), Chlorinated rubbers: Superchlon CR-5 (100), CR-10 (300), CR-20 (1000). (Values in parentheses indicate the viscosity of a 40% toluene solution at 25° C).

The chlorinated polyolefins used according to the present invention are soluble in organic solvents such as aromatic hydrocarbons (benzene, toluene, etc.), esters (ethyl acetate, butyl acetate, etc.), ketones (acetone, methyl ethyl ketone, etc.), chlorinated hydrocarbons. (chloroform, dichloroethane, etc.). Therefore, the chlorinated polyolefins may be dissolved in such solvents and added to the polymerization reaction system.

Any monomers can be used according to the present invention, provided they are polymerizable. They may be vinyl monomers which can undergo self-polymerization, or may be monomers such as dibasic acids and glycols which can, for example, generate polyester resins. They are preferably vinyl monomers.

Examples of monomers to be used according to the present invention are styrenes and styrene derivatives such as styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene, with the most preference given to the styrene monomer. Other vinyl monomers include, for example, ethylenically unsaturated monoolefins such as ethylene, propylene, butylene and isobutylene; vinyl halides such as vinyl chloride, vinylidene chloride, vinyl bromide and vinyl fluoride; vinylesters such as vinyl acetate, vinyl propionate, vinyl benzoate and vinyl butyrate; α-methylene aliphatic monocarboxylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic acid derivatives or methacrylic acid derivatives such as acrylonitrile, methacrylonitrile, acrylamide; vinylethers such as vinyl methyl ether, vinyl ethyl ether and vinyl isobutyl ether; vinylketones such as vinyl methyl ketone, vinyl hexyl ketone and methyl isopropenyl ketone; N-vinyl compounds such as N-vinylpyrrole, N-vinylcarbazole, N-vinylindole and N-vinylpyrrolidone; and vinylnaphthalenes.

These vinyl monomers may be used independently or they may be used in combination with each other to form a copolymer.

Polymerizable monomers other than vinyl type are described below.

As examples of dibasic acids used as monomers to form a polyester resin, the following may be mentioned: terephthalic acid, isophthalic acid, adipic acid, maleic acid, succinic acid, sebacic acid, thioglycolic acid and diglycolic acid. Examples of glycols used as monomers to form a polyester resin are ethylene glycol, diethylene glycol, 1,4-bis (2-hydroxyethyl) benzene, 1,4-cyclohexanedimethanol and propylene glycol.

As monomers to form a polyamide resin, the following can be mentioned: caprolactam, dibasic acids such as terephthalic acid, isophthalic acid, adipic acid, maleic acid, succinic acid, sebacic acid and thioglycolic acid; and diamines such as ethylene diamine, diaminoethyl ether, 1,4-diaminobenzene and 1,4-diaminobutane.

As monomers to form a polyurethane resin, the following can be mentioned: diisocyanates such as p-phenylene diisocyanate, p-xylene diisocyanate, and 1,4-tetramethylene diisocyanate; and glycols such as ethylene glycol, diethylene glycol, propylene glycol and polyethylene glycol.

As monomers to form a polyurea resin, the following can be mentioned: diisocyanates such as p-phenylene diisocyanate, p-xylylene diisocyanate, and 1,4-tetramethylene diisocyanate; and diamines such as ethylene diamine, diaminoethyl ether, 1,4-diaminobenzene and 1,4-diaminobutane.

As monomers to produce an epoxy resin, the following can be mentioned: amines such as ethylamine, butylamine, ethylene diamine, 1,4-diaminobenzene, 1,4-diaminobutane and monoethanolamine; diepoxides such as diglycidyl ether, ethylene glycol diglycidyl ether, diglycidyl ether of bisphenol A, and hydroquinone diglycidyl ether.

In the method of preparing the toner composition according to the present invention, the suspension, emulsion, bulk or solution polymerization process can be used, as an example, to synthesize the polymer used as the binder resin for the toner. The suspension polymerization method is most preferable. As the type of reaction of polymerization, the addition, condensation, and ring opening polymerizations can be applied. In addition, during the course of the polymerization of the monomers described above, it is possible to add coloring agents, and agents to impart characteristics to the toner, such as charge controlling agent and fluidizing agent. It is also possible to insert a granulation process so as to use the toner as such when the polymerization is finished. It is further possible to mix characteristic-imparting agents such as coloring agents after the polymerization of the monomers described above is completed, followed by kneading, cooling and pulverization to prepare the toner. For example, when using a vinyl resin which is obtained by polymerizing an $\alpha$, $\beta$-unsaturated polymerizable monomer, a polymerization initiator, and when necessary, 5 to 95 parts by weight of a prepolymer, and 1 to 20 parts by weight of a coloring agent are added to 100 parts by weight of the monomer. The mixture is polymerized at a temperature of 60° to 120° C. under nitrogen stream in the absence of solvent according to an ordinary method.

The polymer may be prepared by conducting an ordinary suspension polymerization in water in the presence of a dispersing agent such as, for example, gelatin, starch, polyvinyl alcohol, barium sulfate, calcium sulfate, barium carbonate, magnesium carbonate, calcium phosphate, talc, clay, diatom earth and powdered metal oxides. Alternatively, it may be prepared by carrying out emulsion polymerization according to an ordinary method at a temperature of 40° to 90° C. under nitrogen stream using a water-soluble polymerization initiator in the presence of a surface-active agent such as sodium dodecylbenzenesulfonate, alkyl sulfate type anionic emulsifiers, and sodium dodecylsulfonate. It may also be prepared by means of an ordinary bulk polymerization. In addition, it may also be preapred through the solution polymerization according to an ordinary method by diluting the components of the above-mentioned bulk polymerization in an appropriate solvent (e.g., benzene, xylene, ethanol, methyl ethyl ketone, etc.).

In case the polymer according to the present invention is a condensation polymer or an addition polymer, it is possible to prepare a polyester resin by reacting an ordinary dibasic acid with a glycol in the presence of a strong acid (e.g., sulfuric acid, p-toluenesulfonic acid, etc.) while heating to 100°–180° C. or heating under a reduced pressure.

Moreover, it is possible to prepare an ordinary polyamide resin by reacting a dibasic acid with a diamine salt in the molten state while heating to a temperature of 140°–200° C.

It is also possible to prepare a phenol-formaldehyde resin according to an ordinary method by heating formaldehyde and a phenol to a temperature of 100°–150° C. in the presence of a strong acid or base catalyst.

Furthermore, it is possible to prepare a polyurethane resin according to an ordinary method by reacting at a temperature of 50° to 150° C. in the presence of a glycol and a diisocyanate.

In addition, it is possible to prepare a polyurea resin according to an ordinary method by reacting a diamine with a diisocyanate at a temperature of 20° to 100° C.

In case the polymer according to the present invention is a ring opening polymer, an epoxy resin can be prepared according to an ordinary method by reacting a diamine with a diepoxy compound at a temperature of 50°–120° C.

The monomers used according to the present invention may be used independently, or the monomers which can undergo self-polymerization and other monomers may be combined in various ways.

The obtained polymers according to the present invention, that have a ring and ball softening point of 100° to 170° C., are particularly effective for use as the toner resin. Those having a glass transition point of about 40° to 110° C. are most effective. That is, a polymer having a softening point of less than 100° C. tends to undergo over-pulverization or cause the "toner-filming" phenomenon, thereby staining the photoconductive photosensitive plate. If the softening point is above 170° C., the toner is too hard to be pulverized and, in addition, requires a large amount of heat during fixing, thereby lowering the fixing efficiency.

On the other hand, if the glass transition point is below 40° C., the obtained toner easily masses due to the cold flow phenomenon. This is because, normally, the toner is stored at a temperature below 40° C. If the glass transition point is above 110° C., the toner cannot be fixed satisfactorily, particularly when fixing is conducted with rollers at a high speed. This is because, apart from fixing rollers made of a metal, rollers made of e.g., Teflon (Supplier: Du Pont) easily get worn or start to decompose at a fixing roller temperature of above 250° C., and thus the temperature cannot be increased so much due to the limit of heat resistance according to the material of rollers.

The polymers according to the present invention, which have been obtained as described above, may be the toner in the form of fine particles that can be put to practical use as such. In addition, the polymers may be pulverized with a crushing machine, and classified e.g., through a zigzag classification machine to produce the toner. Alternatively, the polymers may be mixed with a coloring agent, etc., kneaded through a kneader, cooled and pulverized to produce the toner.

In every case, the average grain size of the toner according to the present invention is equivalent to that of the toner normally used and, preferably, is within the range of 7 to 50 microns. If the toner contains large particles with a size of 50 microns or more, the images formed become considerably rough. If it contains fine particles with a size of 1 micron or less, such fine particles stain the surface of the photoconductive material, or cause the sensitivity of the photoconductive material and the image quality to drop.

The polymers according to the present invention may be the cross-linked polymers. The cross-linked polymers may be of the type obtained from monomers which undergo self-crosslinking polymerization, like prepolymers (in this case, the monomers which undergo self-cross-linking polymerization may be used in combination with other monomers). Alternatively, a cross-linking agent may exist during the polymerization of monomers.

Any known cross-linking agents can be used according to the present invention, provided that they can cross-linking polymerize the monomers which are used according to the present invention. It is preferable that such a cross-linking agent is a compound having at least two polymerizable vinyl radicals.

Examples of such cross-linking agents include aromatic divinyl compounds such as divinylbenzene, divinylnaphthalene and the derivatives thereof; olefinically unsaturated carboxylic acid esters such as ethylene glycol dimethacrylate, diethylene glycol dimethacrylate, triethylene glycol dimethacrylate, trimethylol propane triacrylate, allylmethacrylate, t-butylaminoethyl methacrylate, tetraethylene glycol dimethacrylate, 1,3-butanediol dimethacrylate; every divinyl compound such as N,N-divinyl aniline, divinyl ether, divinyl sulfide and divinyl sulfone; and compounds having three or more vinyl radicals. These may be used singly or in combination with each other.

In addition, the following may be used as cross-linking agents according to the present invention: dihydric alcohols such as ethylene glycol, triethylene glycol, 1,2-propylene glycol, 1,3-propylene glycol, 1,4-butane diol, neopentyl glycol, 1,4-butene diol, 1,4-bis(hydroxymethyl) cyclohexane, bisphenol A, hydrogenated bisphenol A, polyoxyethylenated bisphenol A, and polyoxypropylenated bisphenol A; dibasic acids and derivatives thereof such as maleic acid, fumaric acid, mesaconic acid, citraconic acid, itaconic acid, glutaconic acid, phthalic acid, isophthalic acid, terephthalic acid, cyclohexanedicarboxylic acid, succinic acid, adipic acid, sebacic acid, malonic acid, anhydrides of these acids and their esters with lower alcohols; alcohols having three or more hydroxyl groups such as glycerine, trimethylolpropane, and pentaerythritol; and carboxylic acids having three or more carboxyl groups such as trimellitic acid and pyromellitic acid.

The amount of such a cross-linking agent added to a monomer is selected from the range of 0.005 to 20% by weight, preferably from the range of 0.1 to 5% by weight. If the amount added is too much, the polymers formed cannot melt or fuse easily, affecting the fixing characteristics of the toners. If the amount added is too low, it is difficult to obtain the necessary characteristics of toners, such as durability, storability and wear resistance.

According to the present invention, polymers are prepared by polymerizing polymerizable monomers in the presence of a chlorinated polyolefin according to the present invention. In the polymerization, it is possible to use polymerization initiators. As examples of such polymerization initiators, the following can be mentioned: lauroyl peroxide, benzoyl peroxide, 2,2'-azobisisobutyronitrile, 2,2'-azobis-(2,4-dimethylvaleronitrile), orthochloro benzoyl peroxide and orthomethoxy benzoyl peroxide.

Polymers are prepared as described above and used as toners according to the present invention. In this case, toner characteristics improving agents such as coloring agent, charge controlling agent, fluidizing agent, prepolymer, releasing agent, magnetic material and other binder resins may be added to improve the characteristics os toners.

When prepolymers are additionally used for the toners according to the present invention, it is further possible to improve storability, humidity resistance, charge characteristics and fixing characteristics of toners such as anti-offset effects in roller fixing.

The prepolymers used according to the present invention are preferably reactive prepolymers. Such reactive prepolymers are those having radicals that can react with the functional groups of the monomers used according to the present invention.

Typical examples of the reactive radicals such as these are carboxyl group —COOH, sulfo group —SO$_3$H, ethylene-imino group

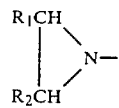

(where $r_1$ and $R_2$ indicate hydrogen atom or an alkyl such as methyl), isocyanate group OCN—, double-bond group —CH=CH—, acid anhydride group

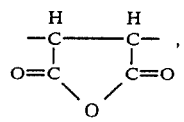

epoxy group

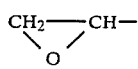

and halogen atoms.

The above-mentioned reactive radicals of prepolymeres embrace various types with reference to the reactions with monomers. That is, they may be of the type that can react with monomers merely through mixing, that can react in the presence of a catalyst such as polymerization initiator, or that can react through light irradiation, like cinnamoyl group.

Prepolymers such as these may have any molecular weight. In general, those having a molecular weight of 1,000 or more, particularly 2,000 to 2,000,000, more particularly 5,000 to 1,000,000 are used.

Typical prepolymeers such as these are, for example, the following:

(Prepolymers having epoxy group)

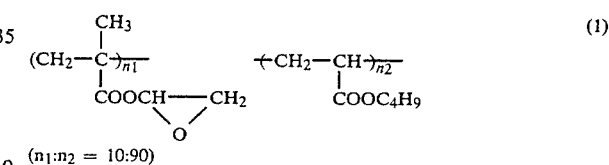

($n_1:n_2$ = 10:90)

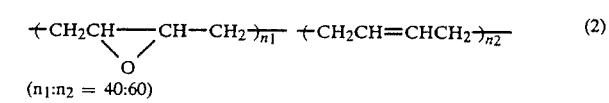

($n_1:n_2$ = 40:60)

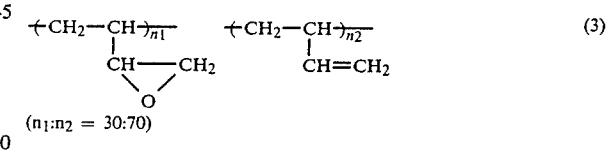

($n_1:n_2$ = 30:70)

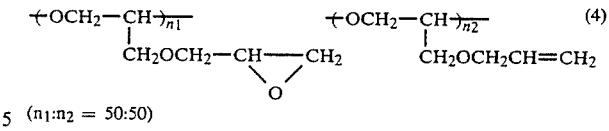

($n_1:n_2$ = 50:50)

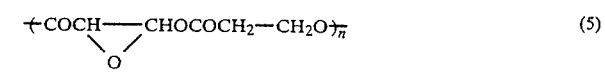

(Prepolymers having ethylene-imino group)

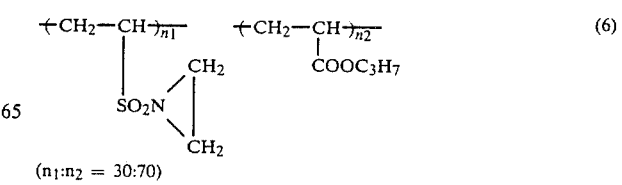

($n_1:n_2$ = 30:70)

-continued

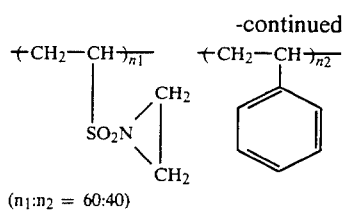

(n₁:n₂ = 60:40)

(Prepolymers having isocyanate group)

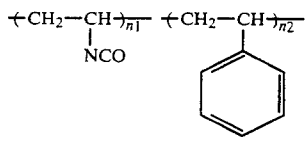

(n₁:n₂ = 20:80)

(Prepolymers having double-bond group)

$+COCH=CHOCOCH_2CH_2O)_n$  (9)

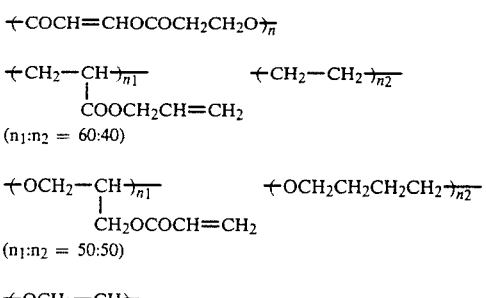

(Prepolymers having acid anhydride group)

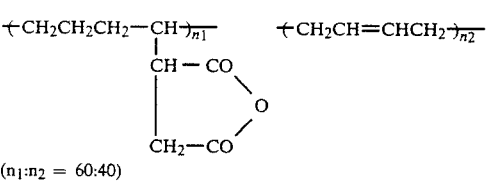

(n₁:n₂ = 60:40)

(Prepolymers having carboxyl group)

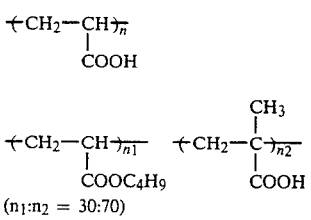

(Prepolymers having sulfo group)

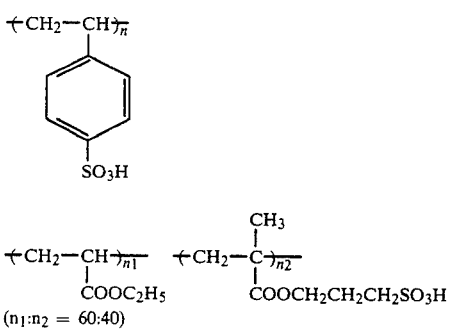

(n₁:n₂ = 60:40)

-continued

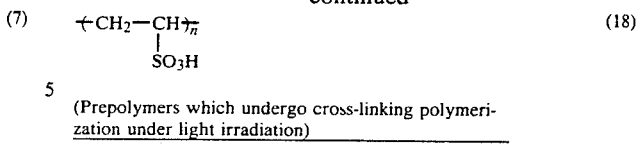 (18)

(Prepolymers which undergo cross-linking polymerization under light irradiation)

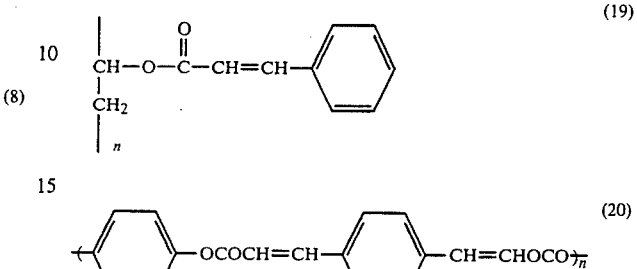

(9)  20

In addition, it is also possible to use butadiene-based prepolymers such as poly-1,2-butadiene, α, ω-polybutadiene glycol, maleic polybutadiene and terminal acryl-modified polybutadiene.

Prepolymers may be added in any proportion, preferably in a proportion of 5 to 95 parts by weight per 100 parts by weight of monomers, particularly 10 to 70 parts by weight per 100 parts by weight of monomers. If the prepolymers are added in a proportion of below 5 parts by weight, they cannot sometimes contribute to the anti-offset effects and improvement of fixing characteristics. If the proportion is above 95 parts by weight, the tackiness is liable to increase excessively, so that storability and fluidity of toners are affected and the offset phenomenon increases.

Any coloring agents such as pigments and dyes may be added, as required, to the toners according to the present invention during or after the polymerization of monomers. These coloring agents may be of the type already known, e.g., carbon black, nigrosine dye, aniline blue, chalcoil blue, chrome yellow, ultramarine blue, Du Pont oil red, quinoline yellow, methylene blue chloride, phthalocyanine blue, malachite green oxalate, lamp black, oil black, azo oil black, and rose bengal and any mixtures thereof. Where the conventional xerography of the typewritten documents is desired, the toners may be prepared from black dyes such as carbon black and amablast black dye.

The amount of the coloring agents added to the toners according to the present invention can change broadly. In general, they are added in a proportion of 1 to 20 parts by weight per 100 parts by weight of monomers.

In case the coloring agents are to be incorporated after preparing the polymers, addition may be carried out as described above.

When using the toners according to the present invention in the roller fixing method (particularly, thermal roller fixing method), a releasing agent can be added to prevent the offset phenomenon. Various types of such releasing agents are known, while the most preferable one is the low molecular weight olefin polymers.

Such low molecular weight olefin polymers are the olefin polymers which are composed of only olefins as the monomer component, or the olefin copolymers which are also composed of, as the monomer component, the monomers other than olefins. Of course, these have in every case a low molecular weight. Olefins used as monomer component include every type of olefins, e.g., ethylene, propylene, butene-1, pentene-1, hexene-1, heptene-1, octene-1, nonene-1 and decene-1; their homologues having the unsaturated bond in the different position; and those having an alkyl group as a branch chain, e.g., 3-methyl-1-butene, 3-methyl-2-pentene and 3-propyl-5-methyl-2-hexene.

As monomers other than olefin that make up copolymers together with olefins, vinylethers such as, e.g. vinyl methyl ether, vinyl n-butyl ether and vinyl phenyl ether; vinyl esters such as, e.g. vinyl acetate and vinyl butyrate; haloolefins such as, e.g. vinyl fluoride, vinylidene fluoride, tetrafluoroethylene, vinyl chloride, vinylidene chloride and tetrachloroethylene; acrylic acid esters or methacrylic acid esters such as, e.g. methyl acrylate, ethyl acrylate, n-butyl acrylate, methyl methacrylate, ethyl methacrylate, n-butyl methacrylate, stearyl methacrylate, N,N-dimethylaminoethyl methacrylate and t-butylaminoethyl methacrylate; acrylic derivatives such as, e.g. acrylonitrile and N,N-dimethylacrylamide; organic acids such as acrylic acid, methacrylic acid, maleic acid, fumaric acid, itaconic acid; and various other compounds such as diethyl fumarate and β-pinene can be mentioned.

Low molecular weight olefin polymers that can be used according to the present invention include olefin polymers made of only olefins, that contain at least 2 kinds of above-mentioned olefins as monomer component, such as, e.g. ethylene-propylene copolymer, ethylenebutene copolymer, ethylene-pentene copolymer, propylenebutene copolymer, propylene-pentene copolymer, ethylene-3-methyl-1-butene copolymer and ethylenepropylene-butene copolymer; or olefin copolymers containing, as monomer component, at least one kind of above-mentioned olefins and at least one kind of above-mentioned non-olefin monomers such as, e.g. ethylene-vinyl acetate copolymer, ethylene-vinyl methyl ether copolymer, ethylene-vinyl chloride copolymer, ethylene-methyl acrylate copolymer, ethylene-methyl methacrylate copolymer, ethylene-acrylic acid copolymer, propylene-vinyl acetate copolymer, propylene-vinyl ethyl ether copolymer, propylene-ethyl acrylate copolymer, propylene-methacrylic acid copolymer, butene-vinyl methyl methacrylate copolymer, pentene-vinyl acetate copolymer, hexene-vinyl butyrate copolymer, ethylene-propylene-vinyl acetate copolymer and ethylene-vinyl acetate-vinyl methyl ether copolymer.

In case the low molecular weight olefin polymers are composed of a monomer other than olefins as their monomer component, it is preferable that the amount of the olefin component contained in the copolymers is as much as possible. This is because, in general, there is a tendency that, as the content of the olefin component decreases, the releasing property becomes poor and that the characteristics of the toners obtained, such as fluidity and image forming property, are deteriorated. Therefore, in the case of the aforesaid copolymers, those containing as much olefin component as possible is desirable. Particularly, those containing olefin component in an amount of about 50 mol % or more can be used effectively according to the present invention.

The low molecular weight polyolefin polymers may have a molecular weight that belongs to the concept of the low molecular weight in the ordinary high polymer chemistry. In general, such polymers have an average molecular weight of 1,000 to 45,000, preferably 2,000 to 6,000.

It is preferable that the low molecular weight polyolefin polymers according to the present invention have a softening point of 100° to 180° C., particularly 130° to 160° C.

The low molecular weight polyolefin polymers according to the present invention are used in an amount of 1 to 20 parts by weight, preferably 3 to 15 parts by weight, per 100 parts by weight of the resin component of toners. If the amount used is below 1 part by weight, sufficient anti-offset effects cannot be obtained. If the amount used is above 20 parts by weight, gelation occurs during polymerization.

Where the toners according to the present invention are used as the one-component type developer, it is possible to add any magnetic materials.

As such magnetic materials, any magnetic materials which are acidic, neutral or basic can be used. In case such materials should exist in the polymerization system, they should have a pH value of 6 or more, preferably pH 6 to 10.

The magnetic materials used according to the present invention are those which are capable of being strongly magnetized by a magnetic field in the direction thereof. Such materials should preferably be black, capable of being dispersed satisfactorily in resins and chemically stable. Moreover, it is preferable that the magnetic materials are in the form of fine powder having a grain size of 1 micron or less. Therefore, magnetite (triiron tetroxide) is most preferable. Typical examples of such magnetic or magnetizable materials include metals such as cobalt, iron and nickel; alloys of metals such as aluminium, cobalt, copper, iron, lead, magnesium, nickel, tin, zinc, antimony, berylium, bithmuth, cadmium, calcium, manganese, selenium, titanium, tungsten and vanadium, and mixtures of such alloys; metallic compounds containing metal oxides such as aluminium oxide, iron oxide, copper oxide, nickel oxide, zinc oxide, titanium oxide and magnecium oxide; refractory nitrides such as vanadium nitride and chromium nitride; carbides such as tungsten carbide and silica carbide; and ferrites and a mixture thereof. It is preferable that the aforementioned ferromagnetic materials have an average grain diameter of about 0.1 to 1 micron. The magnetic materials may preferably be incorporated into the toner at the proportion of about 50 to 300 parts by weight based on 100 parts by weight of polymer component of the toner, and particularly, 90 to 200 parts by weight based on the polymer component of the toner.

The toners according to the present invention are obtained as described above. When polymerizing the monomers or when preparing toners after obtaining the polymers, it is possible to further incorporate binder resins which are already known for use in toners.

To form images through, for example, electrophotography by using the toners according to the present invention, use is made of a selenium photoconductive member, a photoconductive member which has, on a electroconductive substrate, a photoconductive layer containing inorganic photoconductive materials such as zinc oxide, cadmium sulfide, cadmium selenide, cadmium sulfoselenide, lead oxide and mercury sulfide in a form dispersed in a binder resin, or a photoconductive member which has, on a electroconductive substrate, a photoconductive layer containing organic photoconductive materials such as anthracene and polyvinyl carbazole incorporated, as required, in a binder resin.

The entire surface of the photoconductive layer of such a photoconductive member is charged through corona discharge by using, for example, the Corotron or Scorotron charger. Thereafter, the surface of the photoconductive layer is exposed imagewise to light rays, etc. so as to form electrostatic latent images. The formed electrostatic latent images are then developed with a developer, which consists of a mixture of, for example, the toners according to the present invention and glass beads or iron powder carrier, by using, for example, the cascade or magnetic brush method, thereby forming toner images. The formed toner images are pressed against a transfer paper, for example, under corona discharge and transferred thereto. The toner image transferred to the transfer paper are fixed under heat by, for example, a thermal fixing unit which is coated with a fluorine resin or a silicone rubber having a releasing property.

The present invention is further explained with reference to the following examples. Unless otherwise specified, the term "part(s)" used in these examples indicates "part(s) by weight".

EXAMPLE 1

A composition for polymerization was prepared by mixing and dispersing the following:

| | | |
|---|---|---|
| Styrene | 70 | parts |
| n-Butyl methacrylate | 30 | parts |
| "Raven 1250" (carbon black, Supplier: Colombian Carbon) | 5 | parts |
| Azobisisobutyronitrile | 3 | parts |
| "Nikkol NISSO-PB-1000" ($\alpha,\omega$-polybutadiene glycol with a molecular weight of 1000, Supplier: Nippon Soda Co., Ltd.) | 10 | parts |
| Diethylene glycol methacrylate | 1 | part |
| "Viscol 550P" (low molecular weight polypropylene, Supplier: Sanyo Kasei Co., Ltd.) | 5 | parts |
| Chlorinated rubber "Superchlon CR-10" | 10 | parts |

The prepared composition was added to a 1.25 wt-% aqueous polyvinyl alcohol solution contained in a 2-liter separable flask. The obtained mixture was agitated with the "TK Homo Mixer" (Supplier: Tokushu Kikai Kogyo, Inc.) at an agitation speed of 4,000 r.p.m. After agitating for 30 minutes, the grain size range of the dispersed particles was 10 to 15 microns. Then, the temperature of the mixture was raised to 70° C. The polymerization reaction was conducted for 7 hours, while agitating at a speed of 100 r.p.m. with an ordinary agitator, until the polymerization was completed.

After the polymerization was completed, the solid substance was filtered off and dried. A toner according to the present invention, which has an average grain size of 13 microns, was obtained.

The obtained toner according to the present invention was mixed with iron powder carrier according to an ordinary method, thereby forming a two-component type developer.

This two-component type developer obtained was used to form images with "U-Bix-V" (Supplier: Konishiroku Photo Industry Co., Ltd.). The obtained toner images showed no photographic fog. The toner images were clear and showed high density. The fixing characteristics such as offset prevention were also good.

EXAMPLE 2

A composition for polymerization was prepared by mixing the following:

| | | |
|---|---|---|
| Styrene | 90 | parts |
| n-Butyl methacrylate | 10 | parts |
| "Mitsubishi Carbon Black #2300" (carbon black, Supplier: Mitsubishi Chemical Industries) | 5 | parts |
| 2,2'-Azobis-(2,4-dimethylvaleronitrile) | 2 | parts |
| Prepolymer of Compound (10) | 10 | parts |
| Trimethylolpropane triacrylate | 0.5 | part |
| "Viscol 550P" | 5 | parts |
| Chlorinated polypropylene "Superchlon 105H" | 15 | parts |

The prepared composition was added to 1.0% by weight of tricalcium phosphate and distilled water contained in a 2-liter separable flask. A toner according to the present invention was prepared in the same manner as in Example 1, and subjected to an image test as in Example 1. The obtained images did not show any photographic fog. They were clear and showed high density. The fixing characteristics such as offset prevention were also good.

EXAMPLE 3

A composition for polymerization was prepared by mixing the following:

| | | |
|---|---|---|
| "Mapico Black BL-500" (tri-iron tetroxide powder, Supplier: Titan Kogyo K.K.) | 67 | parts |
| Benzoyl peroxide | 1 | part |
| Styrene | 100 | parts |
| Triethylene glycol methacrylate | 0.5 | part |
| "Dimethyl Polysiloxane KR-220" | | |
| Chlorinated polethylene "Superchlon 907MA" | 20 | parts |

Into a 2-liter separable flask, 1.0% by weight of tricalcium phosphate were taken, and distilled water was added. The prepared composition for polymerization was added to this solution. A toner was prepared in the same manner as in Example 1, and was used to develop electrostatic latent images that were obtained using a selenium photosensitive plate. The obtained images showed no photographic fog. They were clear and showed high density. The fixing characteristics such as offset prevention were also good.

EXAMPLE 4

A composition for polymerization was prepared by mixing and dispersing the following:

| | | |
|---|---|---|
| Styrene | 85 | parts |
| n-Butyl methacrylate | 15 | parts |
| "Mitsubishi Carbon Black #30" (carbon black, Supplier: Mitsubishi Chemical Industries) | 5 | parts |
| 2,2'-Azobis-(2,4-dimethylvaleronitrile) | 2 | parts |
| Chlorinated rubber "Superchlon CR-20" | 10 | parts |

On the other hand, an aqueous solution was prepared from 1.0% by weight of tricalcium phosphate and distilled water in a 2-liter separable flask. The prepared composition for polymerization was added to this aqueous solution, and a toner was prepared in the same manner as in Example 1. When measured by the blow off method, the charge amount was 19.5 μc/g.

COMPARATIVE EXAMPLE 1

A toner was prepared in the same manner as in Example 4, except that chlorinated rubber "Superchlon CR-20" was not added. The charge amount of this toner was 4.3 μc/g.

COMPARATIVE EXAMPLE 2

A toner was prepared by mixing the following, followed by melting, kneading and pulverization:

| | |
|---|---|
| Styrene-n-butyl methacrylate copolymer | 100 parts |
| "Mitsubishi Carbon Black #30" | 5 parts |
| Chlorinated rubber "Superchlon CR-20" | 10 parts |

The charge amount measured was 9.8 μc/g. According to the toner charge spectrography, the charge amount distribution of this toner was broad compared with the toner of Example. 4.

We claim:

1. A toner composition for the development of electrostatic latent images which comprises a polymer obtained by polymerizing a polymerizable monomer or monomers in the presence of a chlorinated polyolefin having a degree of chlorination of 0.7 to 0.85 per carbon atom and at least one agent selected from the group consisting of a coloring agent and a magnetic material.

2. A toner composition as claimed in claim 1 which comprises 1 to 30% by weight of said chlorinated polyolefin based on said polymer.

3. A toner composition as claimed in claim 1 wherein said polymer is selected from the group consisting of vinyl polymers, polyester resins, phenol-formaldehyde resins, polyamide resins, polyurea resins and epoxy resins.

4. A toner composition as claimed in claim 3 wherein said polymer is a vinyl polymer obtained by polymerizing at least one monomer selected from styrene, its derivatives and a methylenealiphatic monocarboxylic acid.

5. A toner composition as claimed in claim 1 wherein said polymer possesses a ring and ball softening point of 100° to 170° C.

6. A toner composition as claimed in claim 1 wherein said polymer possesses a glass transition point of 40° to 110° C.

7. A toner composition as claimed in claim 1 wherein the grain size of the toner is in the range of 7 to 50 microns.

8. A toner composition as claimed in claim 1 wherein said polymer is obtained by polymerizing the monomer or monomers in the presence of a cross-linking agent.

9. A toner composition as claimed in claim 8 wherein the added amount of said cross-lihking agent is 0.005 to 20% by weight based on the total amount of the monomer or monomers to be polymerized.

10. A toner composition as claimed in claim 1 wherein said polymer is obtained by polymerizing the monomer or monomers in the presence of a prepolymer.

11. A toner composition as claimed in claim 10 wherein said prepolymer has an average molecular weight of 2,000 to 2,000,000.

12. A toner composition as claimed in claim 10 wherein the added amount of said prepolymer is 5 to 95 parts by weight based on 100 parts by weight of said monomer or monomers.

13. A toner composition as claimed in claim 1 which is to be used for the roller fixing method and which further comprises a releasing agent to prevent the offset phenomenon.

14. A toner composition as claimed in claim 13 wherein said releasing agent is a low molecular weight olefinic polymer.

15. A toner composition as claimed in claim 14 wherein said olefinic polymer has an average molecular weight of 1,000 to 45,000.

16. A toner composition as claimed in claim 13 wherein said releasing agent is used in an amount of 1 to 20 parts by weight based on 100 parts by weight of the resin components of the toner.

17. A toner composition as claimed in claim 1 wherein said composition comprises a magnetic material.

18. A method for preparing a toner composition for the development of electrostatic latent images which comprises polymerizing a monomer or monomers in the presence of a chlorinated polyolefin having a degree of chlorination of 0.7 to 0.85 per carbon atom and at least one agent selected from the group consisting of a coloring agent and a magnetic material.

19. A method as claimed in claim 18 wherein said chlorinated polyolefin exists in the polymerization system in an amount of 1 to 30% by weight based on the total amount of the monomer or monomers.

20. A method as claimed in claim 18 wherein said monomer or monomers are polymerized by means of a polymerization method selected from the group consisting of the suspension polymerization, emulsion polymerization, bulk polymerization and solution polymerization.

21. A method as claimed in claim 18 wherein said monomer or monomers are selected from the group consisting of a vinyl monomer, a dibasic acid, a glycol, caprolactam, a diamine and a diisocyanate.

22. A method as claimed in claim 18 wherein the polymerization is conducted in the presence of a cross-linking agent.

23. A method as claimed in claim 18 wherein the amount of said cross-linking agent is 0.005 to 20% by weight based on the total amount of the monomer or monomers to be polymerized.

24. A method as claimed in claim 18 wherein the polymerization is conducted in the presence, of a prepolymer.

25. A method as claimed in claim 24 wherein the amount of said prepolymer is 5 to 95 parts by weight based on 100 parts by weight of said monomer or monomers.

26. A toner composition as claimed in claim 17 which also contains a coloring agent.

27. A toner composition as claimed in claim 26 wherein said coloring agent is carbon black.

28. A toner composition as claimed in claim 1 which contains a coloring agent and said coloring agent is carbon black.

* * * * *